United States Patent [19]

Takahashi

[11] Patent Number: 4,687,016

[45] Date of Patent: Aug. 18, 1987

[54] EMERGENCY RELEASE VALVE APPARATUS

[75] Inventor: Susumu Takahashi, Niigata, Japan

[73] Assignee: Niigata Engineering Co., Ltd., Tokyo, Japan

[21] Appl. No.: 911,047

[22] Filed: Sep. 24, 1986

[30] Foreign Application Priority Data

Oct. 2, 1985 [JP] Japan ................................ 60-219749
Dec. 5, 1985 [JP] Japan ................................ 60-274242

[51] Int. Cl.$^4$ ............................................. F16L 37/28
[52] U.S. Cl. .................................... 137/240; 137/312; 137/614.01; 137/614.06; 285/320
[58] Field of Search ............. 137/240, 614.01, 614.06, 137/614, 312; 251/174, 287; 285/320, 18

[56] References Cited

U.S. PATENT DOCUMENTS

| | | | |
|---|---|---|---|
| 2,712,454 | 7/1955 | Love ................................ | 137/614.01 |
| 2,994,341 | 8/1961 | Leopold, Jr. et al. ............... | 251/287 |
| 3,106,223 | 10/1963 | Cooper ........................... | 137/614.01 |
| 3,335,999 | 8/1967 | Lowrey ............................ | 251/174 |
| 3,528,447 | 9/1970 | Kolb ................................. | 137/240 |
| 4,004,611 | 1/1977 | Friedell ............................ | 137/614 |

*Primary Examiner*—A. Michael Chambers
*Attorney, Agent, or Firm*—Scully, Scott, Murphy & Presser

[57] ABSTRACT

An emergency release valve apparatus for releasably connecting a pair of pipes together includes a pair of tubular housings, a ball valve member, a rotating shaft and a retaining mechanism. Each housing is secured at one end to a respective one of the pipes. The housings include retaining portions having generally hemispherical interiors adjacent to their other ends. The housings are releasably coupled together so that the hemispherical interiors cooperate to define a generally spherical space inside the housings. The ball valve member is disposed in the spherical space, and includes a pair of generally hemispherical valve elements which are releasably coupled together and respectively accommodated in the retaining portions in sealing relation thereto. The ball valve member is rotatable about an axis of rotation and has a fluid passage formed therethrough. The rotating shaft is operable to rotate the ball valve member between an open position where the fluid passage of the ball valve member is in fluid communication with the housings and a closed position where the fluid communication of the fluid passage thereof with the housings is interrupted. The retaining mechanism retains each valve element in a respective one of the retaining portions in sealing relation thereto to close a respective one of the passages of the housings when the pipes are released from each other.

9 Claims, 8 Drawing Figures

EMERGENCY RELEASE VALVE APPARATUS

BACKGROUND OF THE INVENTION

1. Field of the Invention

The present invention pertains to an emergency release valve apparatus mainly for use in a marine loading arm installation for transferring fluid products.

2. Prior Art

A marine loading arm installation is conventionally employed for unloading petroleum products from a tank vessel to a storage tank on land or for loading the same from the storage tank to the tank vessel. The loading arm installation includes an assembly of articulated pipe sections carrying a flanged end connector and is mounted on a sea berth for bolted connection of the end connector to a similar flanged connector on the manifold of the tank vessel. During the transfer of the fluid cargo, the vessel moves due to wind, tide or wave, and the level of the deck thereof changes. Then, the pivotal arms of the loading arm installation can move following the movement of the vessel. However, an excessive movement of the vessel may cause the intervening space between the vessel and the sea berth to exceed the safety reach of the loading arm. In such a case, since the bolted connection of the loading arm to the manifold is unyielding, one of the pipe sections or other parts of the loading arm will break. Consequently, in the conventional loading arm, in order to prevent the breakage and a serious hazard in that case, an emergency release valve apparatus as shown in FIGS. 1 to 3 of the accompanying drawings is mounted on the loading arm adjacent to the end connector thereof.

The prior art emergency release valve apparatus, generally indicated at 200, includes a pair of shut-off valves 202 comprising, for example, ball valves disposed between the flanged ends of the pipes (not shown) and secured thereto, respectively, drive means 204 for closing the two valves 202 as soon as an emergency arises, and a coupling device 206 which couples the two valves 202 together in ordinary loading or unloading conditions and uncouples them the moment the two valves 202 are closed. The drive means 204 includes a drive hydraulic cylinder 208 operable to rotate stems 202a of the two valves 202 through a link assembly 210 to close simultaneously the two valves 202 in case of emergency. The coupling device 206 includes a plurality of clamping members 212 disposed to straddle opposed inner flanges 202b of the two valves 202 to be coupled, a plurality of connecting rods 214 hinged at their ends to respective pairs of clamping members 212 so as to form an articulated succession of the clamping members 212, the clamping members 212 and the connecting rods 214 being disposed around the inner flanges 202b in the form of a ring provided with a gap between two end clamping members 212, and connecting means 216 having a connecting hydraulic cylinder 216a for releasably coupling the two end clamping members 212 to complete the ring. Thus, in the loading arm installation, when an emergency arises, conventional control means senses the emergency and actuates the drive hydraulic cylinder 208 of the drive means 204 to close the two valves 202, and subsequently actuates the connecting means 216 of the coupling device 206 to uncouple the two valves 202 to disconnect the two pipes.

However, the prior art valve apparatus is excessively heavy as well as intricate in structure since it includes the two valves 202 which are heavy by themselves and the link assembly 210 for driving the two valves 202 with one cylinder 208. Inasmuch as the emergency release valve apparatus is mounted on the loading arm adjacent to the end connector thereof, and is heavy, a large dynamic load is exerted on the pipe sections of the loading arm and a frame for supporting the pipe sections so that great strength is required for the pipe sections and the frame. In addition, in the prior art valve apparatus described above, when the two valves 202 are closed, fluid remains in a vacancy 218 formed between the two valves 202. Therefore, the remaining fluid is scattered during the disconnection of the two valves 202. This is very dangerous in the case where combustible or poisonous fluid cargo is transferred through the loading arm installation. Further, there is sometimes a case where the two valves 202 are kept coupled together for a while after they are closed. In such a case, when very low temperature fluid cargo such as liquefied natural gas is transferred through the loading arm, the pressure of the remaining fluid in the vacancy 218 is increased due to a rise of temperature to cause damage to the valves 202 or the leakage of the fluid.

SUMMARY OF THE INVENTION

It is therefore an object of the present invention to provide an emergency release valve apparatus which is lightweight as well as simple in structure so that a dynamic load exerted on the loading arm is substantially reduced.

Another object of the present invention is to provide an emergency release valve apparatus which prevents fluid in the apparatus from being scattered when two pipes connected together through the apparatus are released from each other.

According to the present invention, there is provided an emergency release valve apparatus for releasably connecting together one ends of a pair of pipes through which a fluid flows comprising a pair of tubular housings each having a fluid passage internally thereof, each of the pair of housings being adapted to be secured at one end to a respective one of the one ends of the pipes so as to be in fluid communication therewith, each of the pair of housings including a retaining portion having a generally hemispherical interior adjacent to the other end thereof, the pair of housings being releasably coupled together generally in coaxial alignment, with the other ends in abutment with each other, so that the hemispherical interiors cooperate to define a generally spherical space inside the housings, a ball valve member disposed in the spherical space, the ball valve member comprising a pair of generally hemispherical valve elements which are releasably coupled together and respectively accomodated in the retaining portions of the housings in sealing relation thereto, the ball valve member being rotatable about an axis of rotation and having a fluid passage formed therethrough, rotating means operable to rotate the ball valve member about the axis of rotation between an open position where the fluid passage of the ball valve member is in fluid communication with the fluid passages of the housings and a closed position where the fluid communication of the fluid passage of the ball valve member with the fluid passages of the housings is interrupted to isolate the fluid passage of the ball valve member from the fluid passages of the housings, and retaining means for retaining each of the valve elements in the retaining portion of a respective one of the housings in sealing relation thereto to close the fluid passage of a respective one of the housings when the pipes are released from each other.

DESCRIPTION OF PREFERRED EMBODIMENTS OF THE INVENTION

Figure 1:
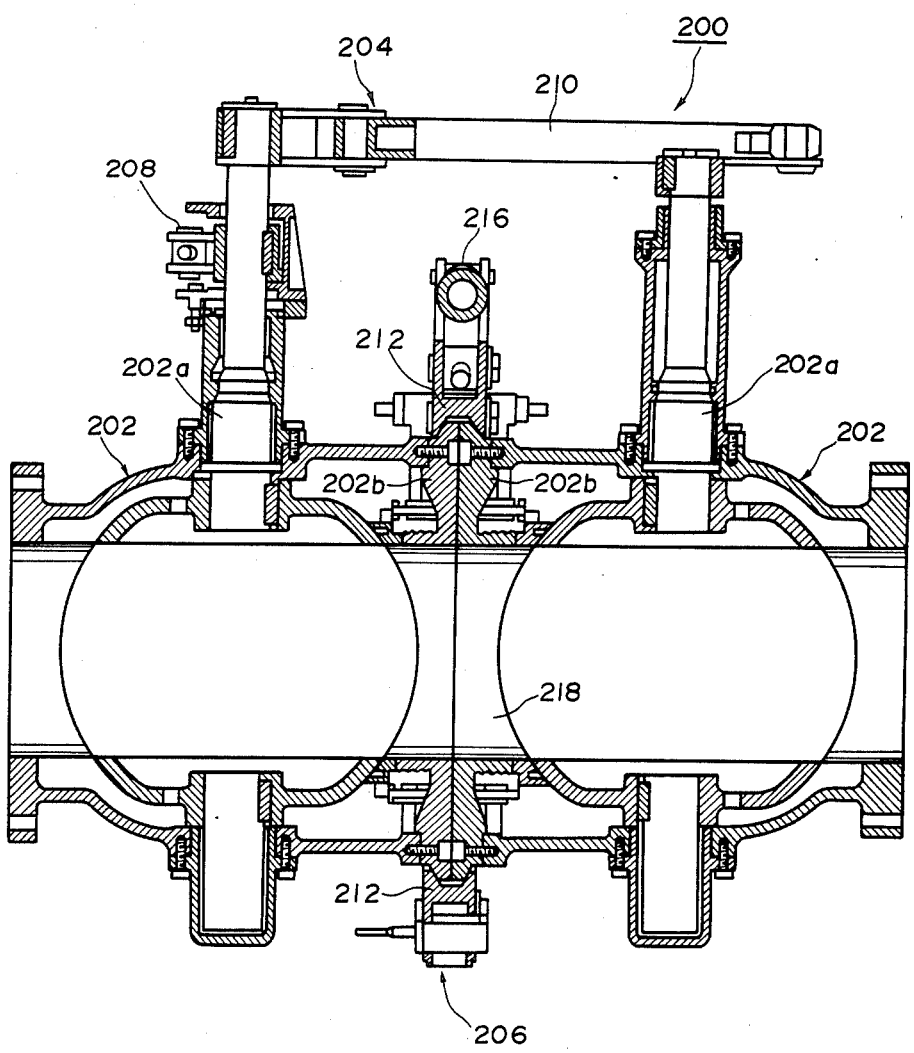
FIG. 1 is a cross-sectional of a conventional emergency release valve apparatus.
Figure 2:
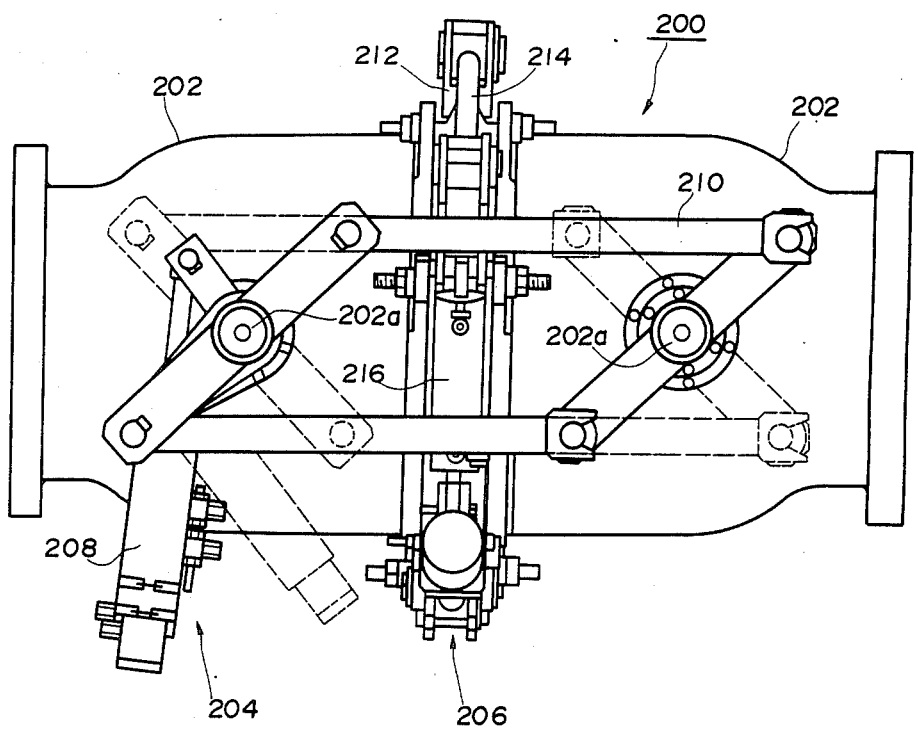
FIG. 2 is a plan view of the emergency release valve apparatus of FIG. 1.
Figure 3:
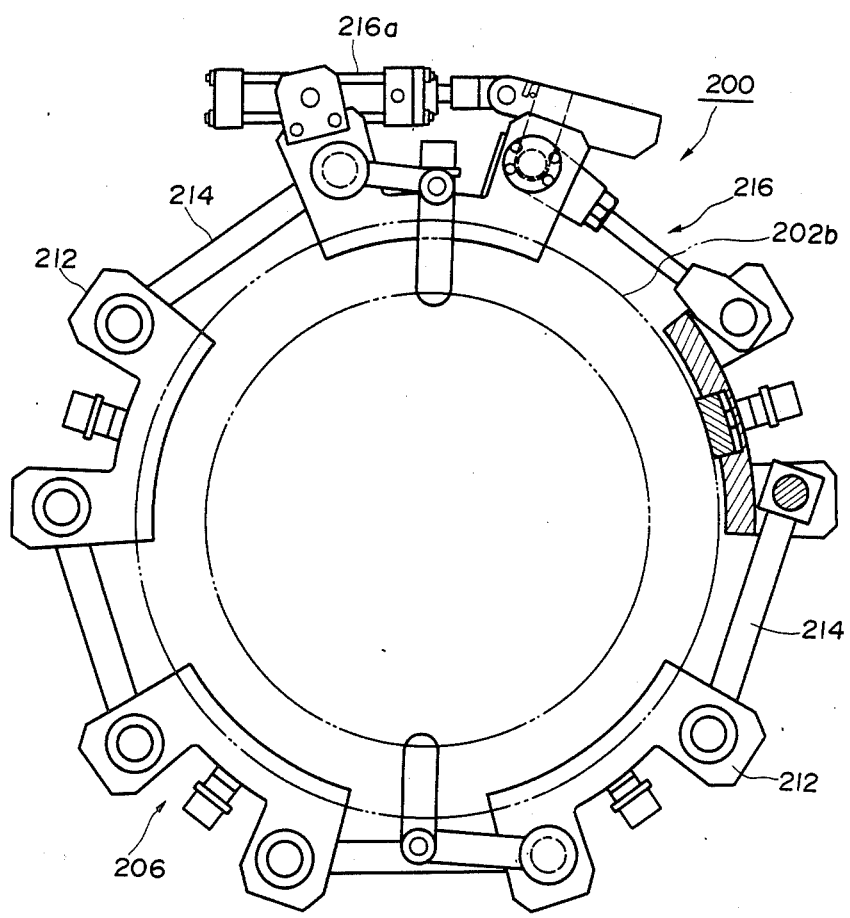
FIG. 3 is a partial cutaway front-elevational view of a coupling device of the emergency release valve apparatus of FIG. 1.
Figure 4:
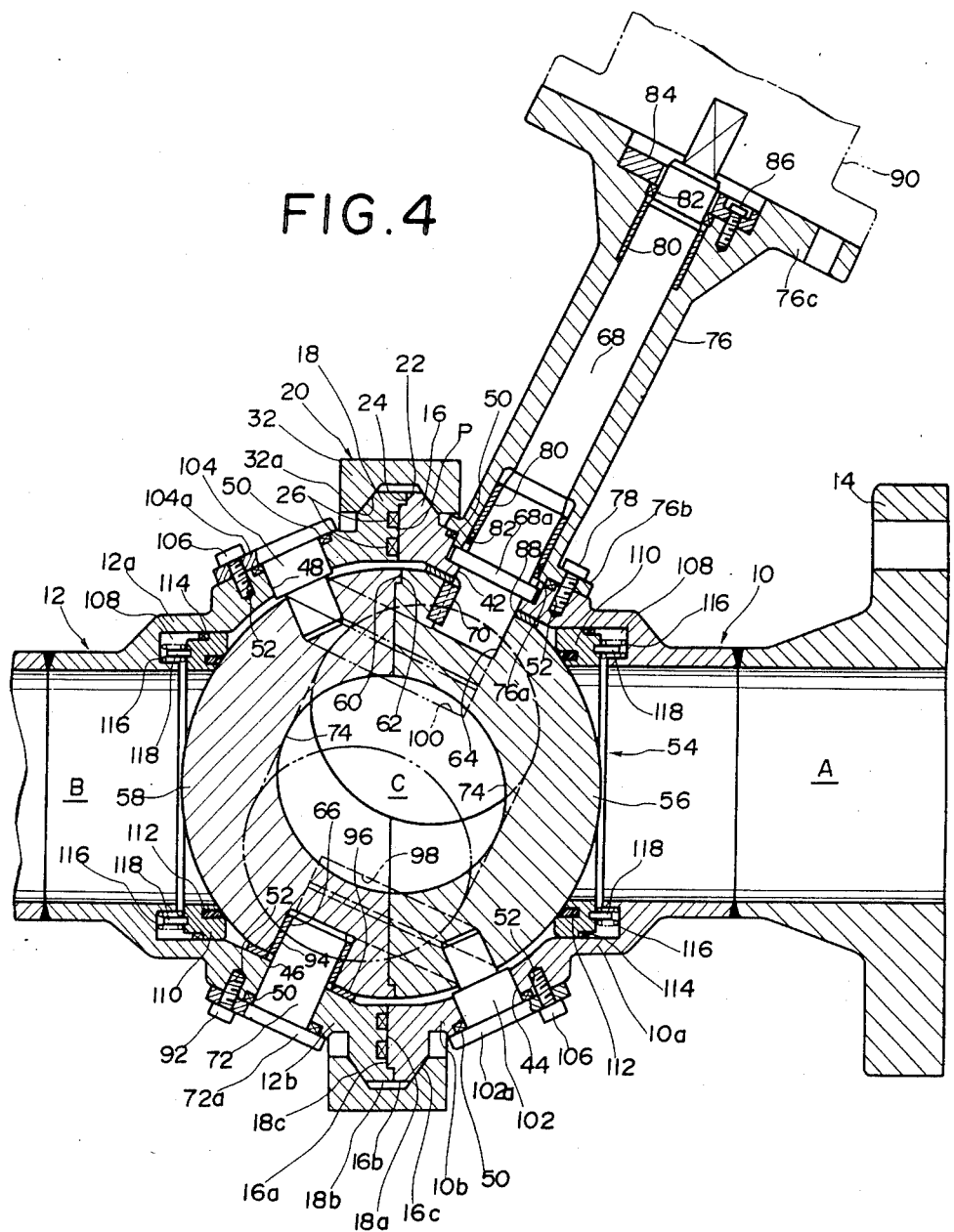
FIG. 4 is a cross-sectional view of an emergency release valve apparatus in accordance with the present invention, the apparatus being shown in a closed position.
Figure 5:
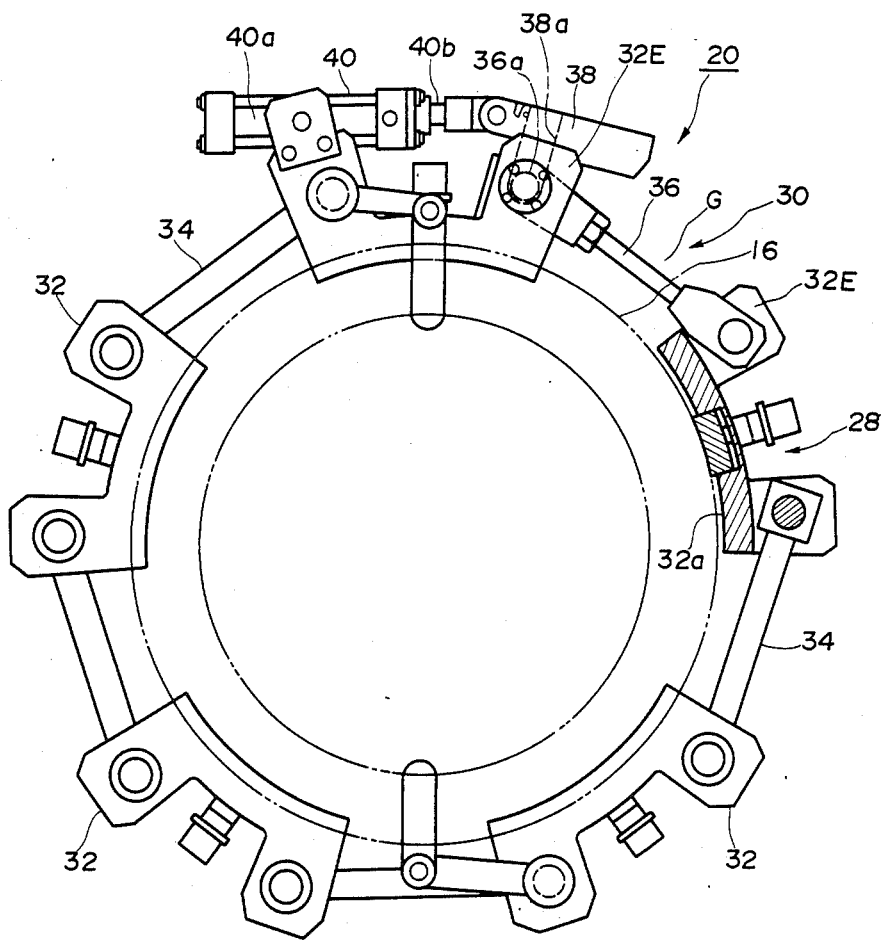
FIG. 5 is a partial cutaway front-elevational view of a coupling device of the emergency release valve apparatus of FIG. 4.
Figure 6:
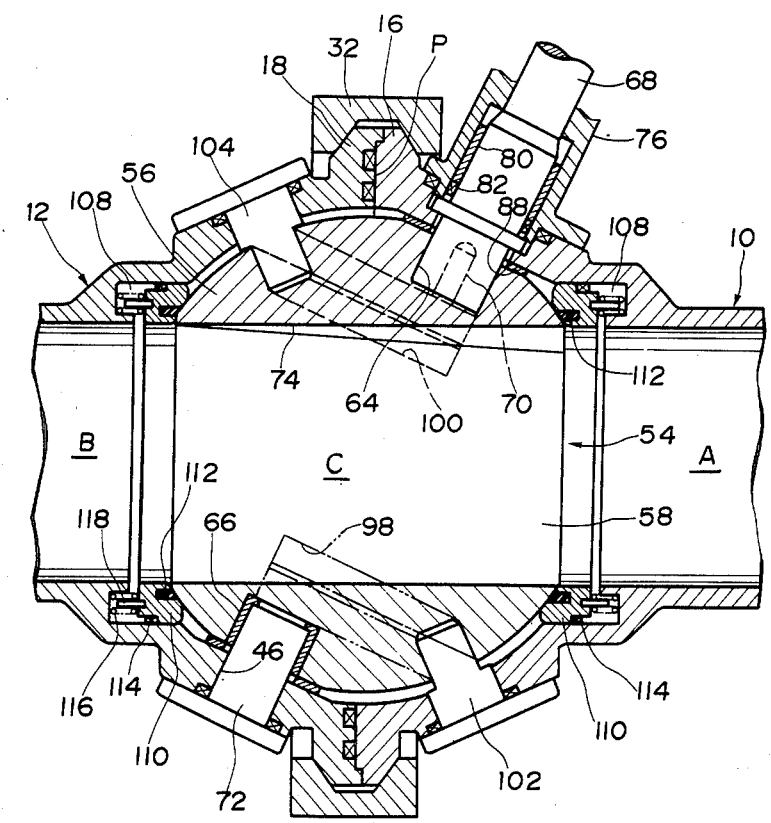
FIG. 6 is a cross-sectional view, similar to FIG. 4 but showing the apparatus in an open position.

Referring to FIGS. 4 to 6, there is illustrated one embodiment of an emergency release valve apparatus for releasably connecting a pair of pipes (not shown) together in accordance with the present invention, in which reference numerals 10 and 12 indicate first and second tubular housings, respectively. The housings 10 and 12 include at one ends thereof outer annular flanges 14 (only one of which is shown) connected to flanged ends of the pair of pipes, respectively, and at the other ends thereof inner annular flanges 16 and 18 having forward end faces 16a and 18a, peripheral surfaces 16b and 18b and rearward surface 16c and 18c, the rearward surfaces 16c and 18c tapering rearwardly from the peripheral surfaces 16b and 18b toward the outer flanges 14, respectively. The housings 10 and 12 are connected together by a coupling device 20 substantially in coaxial alignment, with the inner flanges 16 and 18 held in abutment with each other. The inner flange 16 of the first housing 10 has a circumferential groove 22 formed in the outer margin of the forward end face 16a, and the inner flange 18 of the second housing 12 has a circumferential projection 24 formed on the outer margin of the forward end face 18a and fitted in the groove 22 so that the two inner flanges 16 and 18 are disposed in firm engagement with each other. The inner flange 18 carries two sealing annuli 26 in respective concentric circumferential grooves in its forward end face 18a. The annuli 26 are deformed into sealing relation with the confronting forward end faces 16a and 18a of the inner flanges 16 and 18 to form a radial sealing interface therebetween.

The coupling device 20 generally includes a clamp assembly 28 and coupling means 30. The clamp assembly 28 includes a plurality of clamping members 32 disposed around the inner flanges 16 and 18 of the housings 10 and 12 in circumferentially spaced relation to each other. Each of the clamping members 32 includes a plate having an arcuate groove 32a of a trapezoidal cross-section, and is fitted on the outer periphery of the inner flanges 16 and 18 with the inclined inner side walls of the groove 32a held in contact with the tapered rearward surfaces 16c and 18c thereof, respectively, so that it straddles the inner flanges 16 and 18 and is held in firm engagement therewith. The clamping members 32 are connected to each other by a plurality of connecting rods 34 so as to form an articulated succession in the form of an annulus with a gap G between two end clamping members, specifically designated at 32E. Provided in the gap G between the two end clamping members 32E is the coupling means 30 which releasably couples them. The coupling means 30 includes a coupling rod 36, a rocker lever 38 and a hydraulic drive cylinder 40. The coupling rod 36 is pivotally connected at one end to one of the end clamping members 32E, and has engagement shaft means 36a mounted at the other end thereof. The rocker lever 38 is mounted on the other end clamping member 32E, and has engagement groove means 38a for receiving the engagement shaft means 36a of the coupling rod 36. The rocker lever 38 is pivotable between a coupled position where the groove means 38a opens and extends generally radially outwardly of the inner flanges 16 and 18 and a released position where the groove means 38a opens and extends toward the one end clamping member 32E. In the coupled position, the shaft means 36a is introduced in the groove means 38a, while in the released position, the shaft means 36a is released from the groove means 38a. The drive cylinder 40 is pivotally connected to the other end clamping member 32E, and has a piston slidably received in its cylinder body 40a and a piston rod 40b connected to the piston and extending from the cylinder body 40a. The drive cylinder 40 is responsive to a drive signal produced by a conventional control means to operate the rocker lever 38 to pivot between the coupled and released positions.

Those rearward portions of the housings 10 and 12 having the outer flanges 14 define cylindrical fluid passages A and B of a uniform diameter internally thereof, respectively. Those central portions adjacent to the rearward portions define short cylindrical portions 10a and 12a having an inner diameter larger than that of the rearward portions, respectively. Those forward portions of the housings 10 and 12 having inner flanges 16 and 18 are respectively tapering from the central cylindrical portions 10a and 12a toward the inner flanges 16 and 18 with the inner diameter increased gradually to define retaining portions 10b and 12b having generally hemispherical interiors, respectively. The hemispherical interiors of the retaining portions 10b and 12b of the housings 10 and 12 cooperate to define a generally spherical space or chamber inside the housings 10 and 12.

The retaining portion 10b of the first housing 10 has first and second apertures 42 and 44 of a circular cross-section formed therethrough so as to be symmetrical with respect to the axis of the housing 10. The retaining portion 12b of the second housing 12 has third and fourth apertures 46 and 48 of a circular cross-section formed therethrough so as to be symmetrical with respect to the axis of the housing 12, the third aperture 46 being disposed in coaxial alignment with the first aperture 42 of the first housing 10 with its common axis passing through the common axis of the housing 10 and 12 while the fourth aperture 48 is disposed in coaxial alignment with the second aperture 44 of the first housing 10 with its common axis passing through the common axis of the housings 10 and 12. The common axis of the first and third apertures 42 and 46 and the common axis of the second and fourth apertures 44 and 48 are respectively inclined from a parting plane P on which the sealing interface formed between the inner flanges 16 and 18 lies, and are symmetrical with respect to the parting plane P. Each of the apertures 42 to 48 has a circumferential groove formed at its outer end for receiving a sealing annulus 50. The first aperture 42 has an outer portion of a larger diameter and an inner portion of a smaller diameter while the remaining apertures 44, 46 and 48 have an uniform diameter. That portion of the outer surface of each housing 10, 12 surrounding the outer end of each aperture is generally flat and has interiorly threaded holes 52 formed therein.

Retained in the spherical space of the housings 10 and 12 is a ball valve member 54 comprising first and second valve elements 56 and 58 of a generally hemispherical shape each having a generally hemispherical surface and an planar end face. The first and second valve elements 56 and 58 are accommodated in the retaining portions 10b and 12b of the first and second housings 10 and 12, respectively, and releasably coupled together, with the planar end faces held in contact with each other. The first valve element 56 has a circumferential groove 60 formed in the outer margin of its planar end face, and the second valve element 58 has a circumferential projection 62 formed on the outer margin of its planar end face and fitted in the groove 60 so that the valve elements 56 and 58 are positively prevented from being displaced from each other. The first valve element 56 includes a hole 64 of circular cross-section formed in the hemispherical surface in coaxial alignment with the first aperture 42 of the first housing 10. The second valve element 58 includes a hole 66 of a circular cross-section formed in the hemispherical surface in coaxial alignment with the third aperture 46 of the second housing 12. The first valve element 56 is retained in the retaining portion 10b of the first housing 10 by a rotating stem 68 which is passing through the first aperture 42 and received in the hole 64 of the first valve element 56 at its one end, the rotating stem 68 being secured to the first valve element 56 through a key 70. The second valve element 58 is retained in the retaining portion 12b of the second housing 12 by a support stub shaft 72 which is passing through the aperture 46 of the second housing 12 and recieved in the hole 66 of the second valve element 58 at its one end. With this arrangement, the ball valve member 54 is rotatable about the common axis of the rotating stem 68 and the support shaft 72 which axis is inclined from the parting plane P, and the rotating stem 68 and the support shaft 72 constitute rotating means for rotating the ball valve member 54. Each of the valve elements 56 and 58 has in its planar end face a recess 74 of a generally semicircular cross-section extending in a prescribed direction and opening to the opposite ends thereof, so that the two recesses 74 of the valve elements 56 and 58 cooperate to define a fluid passage C of a circular cross-section with the same diameter as that of the fluid passages A and B of the housings 10 and 12.

The rotating stem 68 includes a flange 68a integrally mounted on its periphery adjacent to the one end thereof and received in the outer portion of the first aperture 42 with its one side in abutment with a shoulder portion formed between the outer and inner portions of the aperture 42. A support pipe 76 is mounted on the first housing 10 at the portion where the first aperture 42 is formed, so that the rotating stem 68 extends through the bore defined in the support pipe 76. The support pipe 76 includes one end 76a having a prescribed diameter slightly smaller than that of the outer portion of the first aperture 42, a small flange 76b adjacent to the one end and a neck flange 76c at the other end thereof. The support pipe 76 is disposed in coaxial alignment with the first aperture 42, with the one end 76a received in the outer portion of the aperture 42 to be held in abutment with the rear side of the flange 68a of the rotating stem 68 and with the flange 76b of the support pipe 76 in abutment with the flat portion of the outer periphery of the first housing 10, and is fixedly secured to the first housing 10 through bolts 78 passing through the flange 76b and threaded into the threaded hole 52 of the first housing 10. A pair of bearing bushes 80 are housed in the bore of the support pipe 76 for bearing the rotating stem 68 to allow the rotation of the stem about its axis, and a pair of annuli 82 are also accommodated in the bore of the support pipe 76. A cover ring 84 for retaining the outer one of the annuli 82 is fitted on the other end of the rotating stem 68 and secured to the neck flange 76c of the support pipe 76 through bolts 86. A thrust washer 88 is interposed between the first valve element 56 and the inner face of the first housing 10, those portion of the valve element 56 and the housing 10 against which the washer 88 abuts being formed flat. The other end of the rotating stem 68 is connected to a hydraulic actuator in the form of a hydraulic motor 90 which is mounted on the neck flange 76c of the support pipe 76. In stead of the hydraulic motor 90, a hydraulic cylinder may be connected to the rotating stem 68 through appropriate transmission means. The hydraulic motor 90 is responsive to a drive signal produced by the conventional control means, and is operable to rotate the stem 68 to move the ball valve member 54 about its axis of rotation between its open and closed positions. In the open position, the ball valve member 54 is, as shown in FIG. 6, disposed in such a manner that the fluid passage C therein is in fluid communication with the fluid passages A and B of the housings 10 and 12, while in the closed position, the ball valve member 54 is, as shown in FIG. 4, disposed in such a manner that the fluid communication of the fluid passage C with the fluid passages A and B is interrupted, and that the planar end faces of the valve elements 56 and 58 are brought into the same plane in which the parting plane P lies. The conventional control means for a loading arm installation usually comprises sensing means for sensing the emergency to produce sensing signals, and a hydraulic drive circuit responsive to the sensing signal to produce first and second drive signals, the hydraulic circuit being operable to first produce the first drive signal for driving the hydraulic motor 90 and to subsequently produce the second drive signal for operating the hydraulic cylinder 40 of the coupling device 20.

The support shaft 72, which includes a head portion 72a formed at the other end thereof, is inserted through the third aperture 46 of the second housing 12 into the hole 66 of the second valve element 58 with the head portion 72a held in abutment with the flat portion of the outer periphery of the housing 12, and is fixedly secured to the second housing 12 through bolts 92 passing through the head portion 72a and threaded into the threaded hole 52 of the second housing 12. A bush 94 is interposed between the support shaft 72 and the hole 66 of the second valve element 58 for facilitating the rotation of the ball valve member 54, and a thrust washer 96 is interposed between the second valve element 58 and the inner face of the second housing 12, those portion of the valve element 58 and the housing 12 against which the washer abuts being formed flat.

The ball valve member 54 also includes a pair of grooves 98 and 100 of a generally square cross-section formed in the hemispherical surfaces of the valve elements 56 and 58 and disposed in diametrically opposite relation. Each groove 98, 100 extends circumferently of a circle disposed in coaxial alignment with the axis of rotation of the ball valve member 54 to have a shape of an arcuate sector having such a length that the central angle of the arcuate sector is 90 degrees. A pair of guide stub shafts 102 and 104, each of which includes a head portion 102a, 104a formed at its end, are inserted through the second and fourth apertures 44 and 48 of the housings 10 and 12 into the grooves 98 and 100 of the valve elements 56 and 58, respectively, with each head portion 102a, 104a held in abutment with the flat portion of the outer periphery of each housing 10, 12, and are fixedly secured to the housings 10 and 12 through bolts 106 passing through the head portions 102a, 104a and threaded into the threaded holes 52 of the housings 10 and 12, respectively. Each guide shaft 102, 104 is received in a respective one of the grooves 98 and 100 to allow relative sliding movement therebetween when the ball valve member 54 is rotated, and serves to guide the rotating movement of the ball valve member 54 within the limits imposed by the length of the groove 98, 100. The guide shafts 102 and 104 respectively cooperate with the rotating stem 68 and the support shaft 72 to constitute retaining means for retaining the valve elements 56 and 58 in the retaining portions 10b and 12b of the housings 10 and 12 in sealing relation thereto to close the fluid passages A and B of the housings 10 and 12 when the housings 10 and 12 are released from each other.

Each housing 10, 12 includes an annular recess 108 formed in a shoulder portion of its inner surface between the short cylindrical portion 10a, 12a and the rearward portion thereof and extending circumferentially thereof. Housed in the short cylindrical portion 10a, 12a is a sealing ring 110 carrying a main sealing annulus 112 in a circumferential groove in its forward end face and a radial sealing annulus 114 in a circumferential groove in its outer periphery adjacent to its rearward end. A plurality of springs 116 are accommodated in the recess 108 and act between the rear face of the sealing ring 110 and the bottom face of the recess 108 to urge the sealing ring 110 toward the valve element 56, 58. Each spring 116 is mounted around a guide pin 118 which is mounted onto the rear face of the sealing ring 110 for holding the spring 116 in appropriate place. The sealing rings 110 serve to keep sealing relation between the housings 10 and 12 and the valve elements 56 and 58, respectively, and also serve as part of the retaining means.

The valve apparatus described above is mounted on the pipes of the loading arm adjacent to an end connector which is connected to a similar end connector on a manifold of a tank vessel. During the loading or unloading of fluid products through the loading arm, the housings 10 and 12 of the valve apparatus are coupled together and clamped by the coupling device 20, and the ball valve member 54 is, as shown in FIG. 5, in an open position so that the fluid passage C thereof is in fluid communication with the fluid passages A and B of the housings 10 and 12 and hence with the pipes. In this condition, if an emergency arises, the hydraulic motor 90 is operated in response to the first signal produced from the conventional control means, which is operated manually or automatically. Then, the rotating stem 68 is rotated by the hydraulic motor 90 to move the ball valve member 54 to its closed position, so that the fluid communication of the fluid passage C of the ball valve member 54 with the fluid passages A and B of the housings 10 and 12 is shut off. Subsequently, the coupling device 20 is actuated to uncouple the inner flanges 16 and 18 of the housings 10 and 12, so that the housings 10 and 12 are released from each other. That is, the hydraulic cylinder 40 is actuated so that the piston rod 40b thereof is extended. Then, the rocker lever 38 is pivoted clockwise in FIG. 5. As the rocker lever 38 pivots clockwise, the engagement groove means 38a thereof is caused to be inclined toward the one end clamping member 32E, and the engagement shaft means 36a of the rod 36 which have been received in the engagement groove 38a is caused to move along the engagement groove 38a outwardly thereof. When the rocker lever 38 is further pivoted into the open position, the engagement shaft 36a is released from the groove 38a, so that the two end clamping members 32 are uncoupled, thereby bringing the clamp assembly 28 into a released condition. As a result, due to external force exerted on the apparatus, the housings 10 and 12 are uncoupled from each other. Then, since the first valve element 56 of the ball valve member 54 is retained in the retaining portion 10b of the first housing 10 by the rotating stem 68 and the guide shaft 102 while the second valve element 58 thereof is retained in the retaining portion 12b of the second housing 12 by the support and guide shafts 72 and 104, the ball valve member 54 is separated into the two valve elements 56 and 58 to complete the release operation of the pipes.

In the valve apparatus described above, only one ball valve member 54 is accommodated in the housings 10 and 12 to close the two pipes in case of emergency, and it is not required to mount a link assembly on the apparatus as is the case with the conventional apparatus. Accordingly, the valve apparatus is lightweight as well as simple in structure, so that the dynamic load exerted on the loading arm is substantially reduced.

In addition, when the ball valve member 54 is parted into the two valve elements 56 and 58, the first valve element 56 of the ball valve member 54 is retained in the retaining portion 10b of the first housing 10 by the rotating stem 68 and the guide shaft 102 while the second valve element 58 thereof is retained in the retaining portion 12b of the second housing 12 by the support and guide shafts 72 and 104, and besides the sealing rings 110 are resiliently urged by the springs 116 toward the respective valve elements 56 and 58 to keep the valve elements 56 and 58 unrotated in the respective housings 10 and 12. Therefore, the valve elements 56 and 58 are firmly hold in their closed positions. Further, since each of the sealing rings 110 is resiliently urged by the springs 116 toward each of the valve elements 56 and 58, the sealing relation between each of the valve elements 56 and 58 and each of the housings 10 and 12 is reliably maintained to prevent the fluid from leaking. Also, when rotated, the ball valve member 54 is guided by the guide shafts 102 and 104, so that the rotation of the ball valve member 54 is effected smoothly and stably. Further, since the limit is imposed on the rotation by the length of the grooves 98 and 100 in the valve elements 56 and 58, it is by no means probable that the ball valve member 54 is rotated unduly.

Still further, in the valve apparatus described above, the axis of rotation of the ball valve member 54 is inclined with respect to the parting plane P, so that the rotating stem 68 is adequately spaced from the parting plane P. Therefore, the stem 68 and the motor 90 do not interfere with the coupling device 20 disposed around the inner flanges 16 and 18 of the housings 10 and 12, so that the apparatus is so simple in structure as to be easily constructed. Further, since the rotating stem 68 and the support shaft 72 not only serve to rotate the valve elements 56 and 58 serve to retain them in the housings 10 and 12 as well, it is sufficient to mount only a pair of the guide shafts 102 and 104 for retaining the valve elements 56 and 58 in the housings 10 and 12. Further, since the ball valve member 54 has the cylindrical fluid passage C having the same diameter as that of the fluid passages A and B of the housings 10 and 12 and hence the pipes, there is no pressure loss in the apparatus in its full open position.

Figure 7:
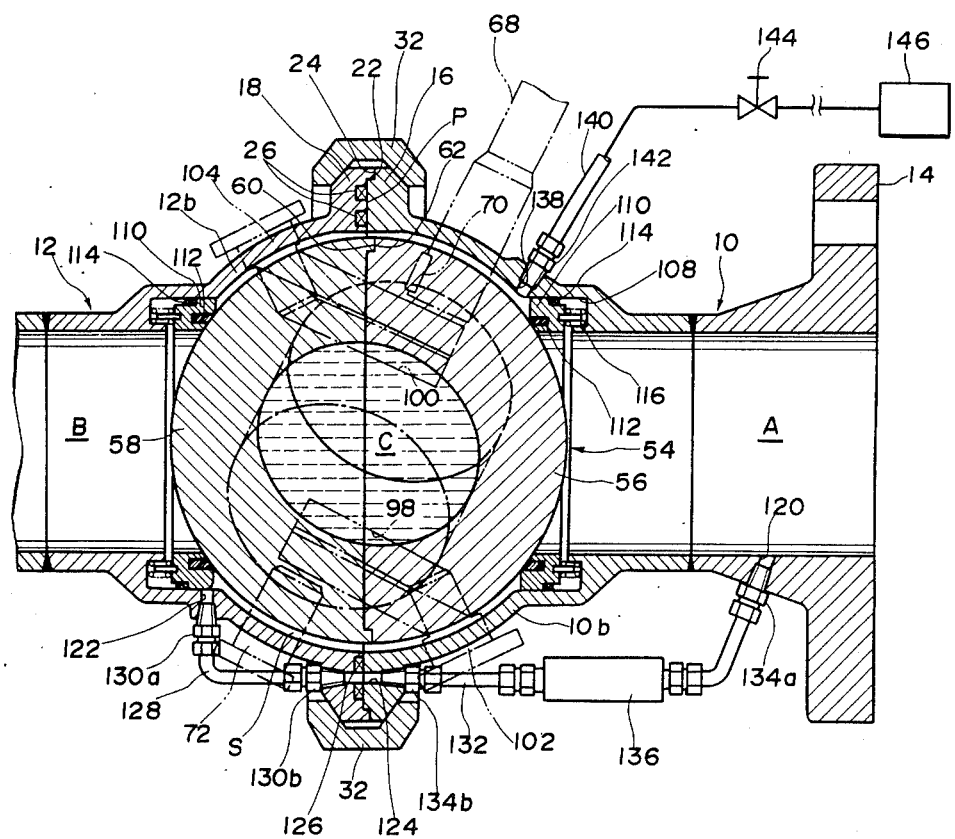
FIG. 7 is a cross-sectional view of a modified emergency release valve apparatus, the apparatus being shown in the closed position.
Figure 8:
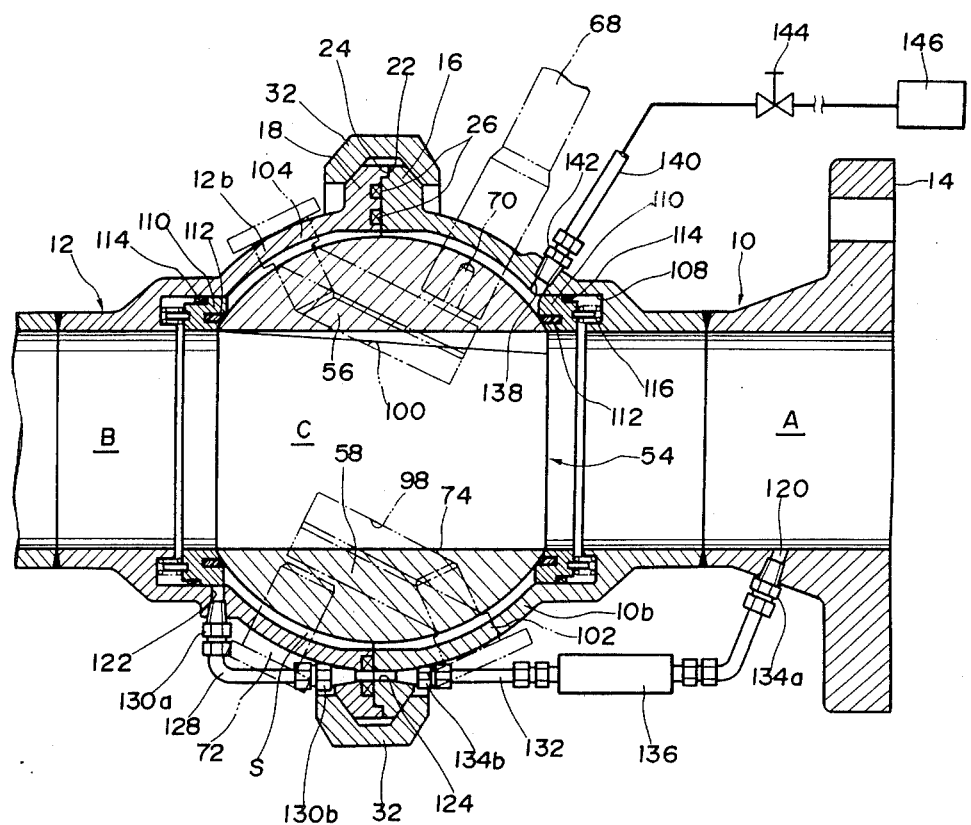
FIG. 8 is a cross-sectional view, similar to FIG. 7 but showing the valve apparatus in the open position.

FIGS. 7 and 8 show a modified valve apparatus in accordance with the present invention, in which the same reference characters are used to designate the same parts or elements as those of the valve apparatus in accordance with the first embodiment. This apparatus is disposed vertically on the pipes of the loading arm in such a manner that the second housing 12 is disposed closer to the end connector thereof, and has discharge means for discharging the fluid, which is remained in the fluid passage C of the ball valve member 54 isolated from the fluid passages A and B of the housings 10 and 12 in the closed position of the ball valve member 54, into the fluid passage A of the first housing 10. In this valve apparatus, the first housing 10, which is disposed on the upper side, includes a fluid inlet aperture 120 formed therethrough in the rearward portion thereof adjacent to the outer flange 14, and the second housing 12, which is disposed on the lower side, includes a fluid outlet aperture 122 formed therethrough in the central cylindrical portion 12a thereof. The outlet aperture 122 of the second housing 12 is disposed so as to be communicated with a sealed space or chamber S at the lowest portion thereof, which chamber S is defined by the housings 10 and 12, the ball valve member 54 and the sealing rings 110. The inner flanges 16 and 18 of the first and second housings 10 and 12 include first and second fluid apertures 124 and 126 formed therethrough and extending axially of the housings 10 and 12, respectively, the first and second fluid apertures 124 and 126 being in communication with each other. Each of the fluid apertures 120 and 126 has an interiorly threaded portion adjacent to its outer end for receiving a connector. The outlet aperture 122 and the second aperture 126 of the second housing 12 are communicated with each other by a first connecting pipe 128, the pipe 128 having at its opposite ends a pair of connectors 130a and 130b coupled to the threaded portions of the outlet and second fluid apertures 122 and 126, respectively. The inlet and first apertures 120 and 124 of the first housing 10 are communicated with each other by a second connecting pipe 132 having at its opposite ends a pair of connectors 134a and 134b coupled to the threaded portions of the inlet and second fluid apertures 120 and 124, respectively, the second connecting pipe 132 having at its central portion a check valve 136 mounted thereon for allowing the fluid to pass from the second fluid aperture 124 to the fluid inlet aperture 120 while preventing a back flow from the inlet fluid aperture 120 to the second fluid aperture 124.

The first housing 10 also includes an air inlet aperture 138 formed therethrough at the retaining portion 10b thereof, the aperture 138 having an interiorly threaded portion adjacent to its outer end. The air inlet aperture 138 is disposed so as to be communicated with the chamber S at the highest portion thereof. An air supply pipe 140 having a connector 142 at its one end is connected to the air inlet aperture, with the connector 142 coupled to the threaded portion thereof. The air supply pipe 140 has a control valve 144 at its appropriate portion, and is connected at its other end to a compressed air source 146, the valve 144 being responsive to a control signal produced by the conventional control means. The control means is operable to first produce the first drive signal for driving the hydraulic motor 90 and to subsequently produce the second drive signal for opening the valve 144 and to subsequently produce the third device signal for operating the coupling device 20.

In the modified valve apparatus described above, when an emergency arises, the control means works to actuate the hydraulic motor 90 to rotate the ball valve member 54 to its closed position. In the closed position, the fluid remains in a closed space defined by the fluid passage C of the ball valve member 54 and the chamber S since the fluid passage C of the ball valve member 54 is communicated with the chamber S. Subsequently, the control means works to open the valve 144 on the air supply pipe 140 to supply the high-pressure compressed air from the air source 146 to the closed space through the air supply pipe 140. Then, the remaining fluid is discharged by the compressed air from the closed space through the connecting pipes 128 and 132 and the check valve 136 into the first housing 10 connected to the upstream portion of the loading arm. Subsequently, the control means actuates the coupling device 20 to release the housings 10 and 12 from each other, so that the ball valve member 54 is parted into the two valve elements 56 and 58 to complete the releasing operation.

In the valve apparatus, the remaining fluid is discharged into the loading arm without being scattered, so that it is very safe even in the case where combustible or poisonous fluid cargo is transferred through the loading arm installation. In addition, since the outlet aperture 122 is formed in the second housing 12 so as to be communicated with the chamber S at the lowest portion thereof, the fluid remaining in the closed space is completely discharged. Further, after the ball valve member 54 is closed, it is sometimes kept coupled with the fluid remained in the closed space for preparing to cope with the emergency. In such a case, when very low temperature fluid cargo such as liquefied natural gas is transferred through the loading arm, due to a rise of the temperature, the remaining fluid vaporizes so that the pressure thereof is increased. As the presence increases, the fluid is caused to flow through the pipes 128 and 132 into the first housing 10 to reduce the pressure to an appropriate degree, so that the damage of the apparatus and a fluid leakage are prevented from occurring.

Obviously many modifications and variations of the present invention are possible in the light of the above teachings. It is therefore to be understood that within the scope of the appended claims, the invention may be practiced otherwise than as specifically described.

What is claimed is:

1. An emergency release valve apparatus for releasably connecting together one ends of a pair of pipes through which a fluid flows, comprising:

a pair of tubular housings each having a fluid passage internally thereof, each of said pair of housings being adapted to be secured at one end to a respective one of said one ends of said pipes so as to be in fluid communication therewith, each of said pair of housings including a retaining portion having a generally hemispherical interior adjacent to the other end thereof;

coupling means for releasably coupling said pair of housings together generally in coaxial alignment with the other ends in abutment with each other, so that said hemispherical interiors cooperate to define a generally spherical space inside said housings;

a ball valve member disposed in said spherical space, said ball valve member comprising a pair of generally hemispherical valve elements which are releasably coupled together and respectively accommodated in said retaining portions of said housings in sealing relation thereto, said ball valve member being rotatable about an axis of rotation and having a fluid passage formed therethrough;

rotating means operable to rotate said ball valve member about said axis of rotation between an open position where said fluid passage of said ball valve member is in fluid communication with said fluid passages of said housings and a closed position where the fluid communication of said fluid passage of said ball valve member with said fluid passages of said housings is interrupted to isolate said fluid passage of said ball valve member from said fluid passages of said housings;

retaining means for retaining each of said valve elements in said retaining portion of a respective one of said housings in sealing relation thereto to close said fluid passage of a respective one of said housings when said pipes are released from each other; and discharge means for discharging fluid which remains in said fluid passage of said ball valve member isolated from said fluid passages of said housings in said closed position of said ball valve member, into said fluid passage of one of said pair of housings.

2. An emergency release valve apparatus according to claim 1, in which said rotating means includes a rotating stem operable to rotate said ball valve member and a support shaft disposed coaxially with said rotating stem, said rotating stem having an axis inclined axially of said housings from a parting plane at which said housings are separated during uncoupling, said rotating stem extending through one of said housings for rotation and being fixedly secured to one of said valve elements retained in said one housing while said support shaft extends through the other of said housings and is inserted at one end thereof in a hole formed in the other of said valve elements.

3. An emergency release valve apparatus according to claim 1, in which a pair of sealing rings are housed in said pair of housings, respectively, each of said sealing rings being disposed between said housing and said valve element housed therein so as to keep sealing relation between said housing and said valve element, each of said sealing rings having spring means which is mounted and acts between said housing and said sealing ring housed therein to resiliently urge said sealing rings toward said valve elements.

4. An emergency release valve apparatus according to claim 1, in which each of said valve elements includes a planar end face and a generally hemispherical surface, one of said valve elements having circumferential groove means formed in said end face thereof while the other of said valve elements has projection means formed on said end face and fitted in said groove means so that said valve elements are positively prevented from being displaced from each other in their coupled condition.

5. An emergency release valve apparatus according to claim 1, in which said retaining means includes guide shaft means mounted on side housings to project into said generally spherical space in said housings, guide groove means formed in said ball valve member, a rotating stem operable to rotate said ball valve member and a support shaft disposed coaxially with said rotating stem, said guide shaft means being inserted into said groove means to allow relative sliding movement therebetween, said guide groove means extending circumferentially of a circle disposed in coaxial alignment with said axis of rotation of said ball valve member to have a shape of an arcuate sector having such a length that a central angle of said arcuate sector is 90 degrees, said rotating stem having an axis inclined axially of said housings from a parting plane at which said housings are separated during uncoupling, said rotating stem extending through one of said housings for rotation and being fixedly secured to one of said valve elements retained in said one housing while said support shaft extends through the other of said housings and is inserted at one end thereof in a hole formed in the other valve element, said rotating stem and said support shaft cooperating with said guide shaft means to retain each of said valve elements in said retaining portion of a respective one of said housings.

6. An emergency release valve apparatus according to claim 1 in which a pair of sealing rings are housed in said pair of housings, respectively; each of said sealing rings being disposed between said housing and said valve element housed therein so as to keep sealing relation between said housing and said valve element; said sealing rings, said housing and said ball valve member defining a closed space in said closed position of said ball valve member, said discharge means including passage means communicating said closed space with said fluid passage of said one housing, and gas supply means for supplying pressurized gas into said closed space to purge the fluid remaining in said closed space through said passage means into said fluid passage of said one housing.

7. An emergency release valve apparatus according to claim 6, in which said gas supply means has a gas inlet formed in said housing so as to be communicated with said closed space at the highest portion thereof, said passage means having a fluid outlet formed in said housing so as to be communicated with said closed space at the lowest portion thereof.

8. An emergency release valve apparatus according to claim 7, in which said passage means includes a pair of fluid apertures which are formed through said other ends of said housings, respectively, and extend axially of said housings so as to be in fluid communication with each other, a fluid inlet formed in said one housing so as to be communicated with said fluid passage thereof, a first fluid passage for communicating said fluid outlet with said fluid aperture in said other end of said other housing, a second fluid passage for communicating said fluid inlet with said aperture in said other end of said one housing, and check valve means mounted on said second fluid passage for preventing the fluid from flowing from said fluid inlet to said fluid outlet.

9. An emergency release valve apparatus according to claim 7, in which said gas inlet and said fluid outlet are disposed in generally diametrically opposite relation with respect to said ball valve member.

* * * * *